United States Patent [19]

Taki

[11] Patent Number: 5,502,697
[45] Date of Patent: Mar. 26, 1996

[54] DISC PROCESSING APPARATUS HAVING ROTATABLE STOCKER AND MOVING DRIVE UNIT

[75] Inventor: Yoshitsugu Taki, Kanagawa, Japan

[73] Assignee: Sony Corporation, Tokyo, Japan

[21] Appl. No.: 376,119

[22] Filed: Jan. 19, 1995

Related U.S. Application Data

[63] Continuation of Ser. No. 20,999, Feb. 22, 1993, abandoned.

[30] Foreign Application Priority Data

Feb. 25, 1992 [JP] Japan ................... 4-073189

[51] Int. Cl.$^6$ ............... G11B 17/30; G11B 17/08
[52] U.S. Cl. ............... 369/34; 369/195; 369/199; 369/38; 360/92
[58] Field of Search ............... 369/34, 36, 38, 369/39, 191, 194, 195, 199; 360/98.05, 98.06, 92

[56] References Cited

U.S. PATENT DOCUMENTS

| | | | |
|---|---|---|---|
| 4,580,254 | 4/1986 | Hojyo et al. | 369/39 |
| 4,815,056 | 3/1989 | Toi et al. | 369/36 |
| 4,817,071 | 3/1989 | Carlson et al. | 369/36 |
| 4,878,137 | 10/1989 | Yamashita et al. | 360/98.05 |
| 4,918,548 | 4/1990 | O'Donnell et al. | 360/92 |
| 4,926,406 | 5/1990 | Ikedo et al. | 369/36 |
| 5,033,038 | 7/1991 | Kobayashi et al. | 369/36 |
| 5,062,092 | 10/1991 | Siryj et al. | 369/38 |

FOREIGN PATENT DOCUMENTS

| | | | |
|---|---|---|---|
| 1-55780 | 3/1989 | Japan | 369/191 |
| 1173467 | 7/1989 | Japan | 369/100 |

Primary Examiner—Stuart S. Levy
Assistant Examiner—William J. Klimowicz
Attorney, Agent, or Firm—William S. Frommer; Alvin Sinderbrand

[57] ABSTRACT

A drive unit having an input/output port for loading and/or unloading a cartridge therethrough and for reading and/or writing information on a disc; a stocker arranged to be confronted with the input/output port of the drive port and having a plurality of storage locations removably storing the cartridges therein, the storage locations being arranged to store the cartridges along a length thereof so that the stored cartridges are aligned substantially in parallel to each other; a vertical carrier for transporting the drive unit in a vertical direction parallel to the length of the storage locations of the stocker so that the input/output port of the drive unit can be confronted with one of the plurality of storage locations of the stocker; and a horizontal carrier for transporting the cartridge in a horizontal direction so as to transport the cartridge between the stocker and the drive unit.

8 Claims, 12 Drawing Sheets

DISC PROCESSING APPARATUS HAVING ROTATABLE STOCKER AND MOVING DRIVE UNIT

This application is a continuation of application Ser. No. 08/020,999, filed Feb. 22, 1993, now abandoned.

BACKGROUND OF THE INVENTION

1. Field of the Invention

The present invention relates to a disc processing apparatus for processing disc cartridges (including recording mediums such as optical discs or magnetic tapes) arranged on storage locations for a drive unit.

2. Description of the Prior Art

Figure 1A:
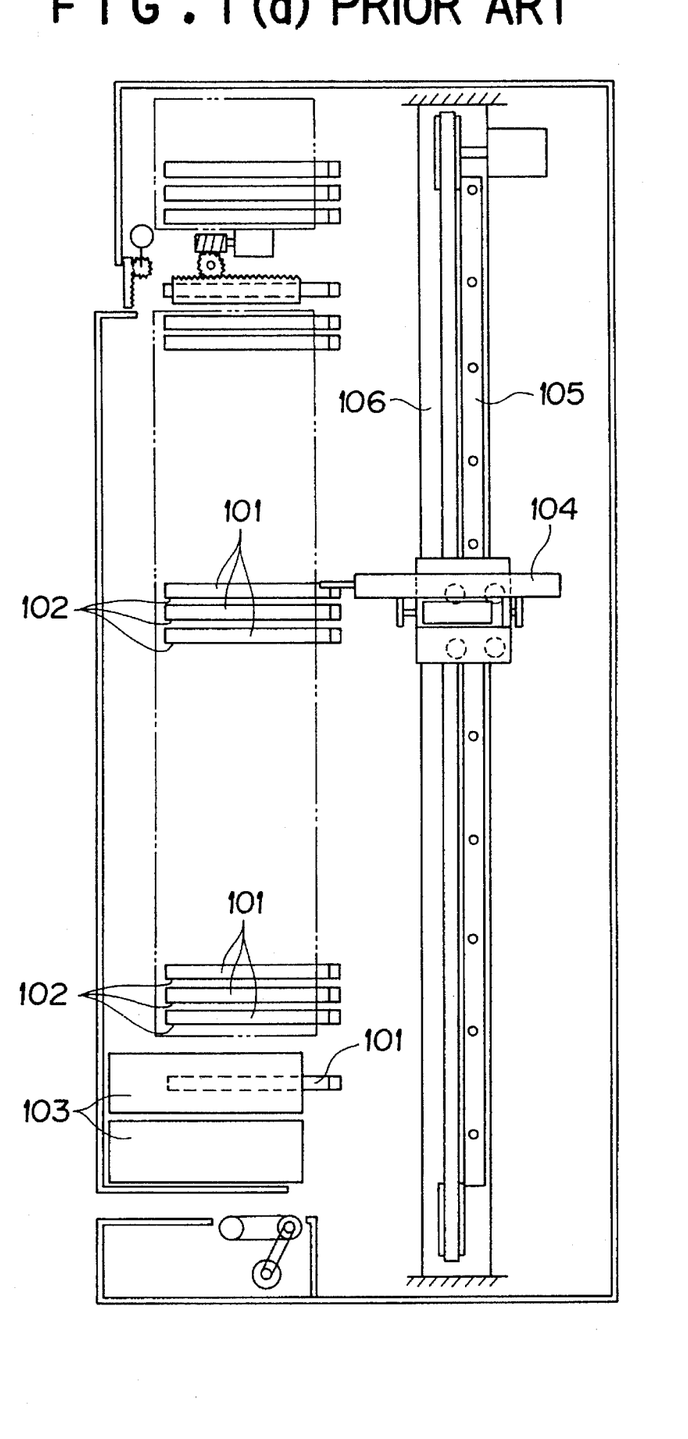
FIG. 1(a) is a side view showing an example of a prior art disc processing apparatus.
Figure 1B:
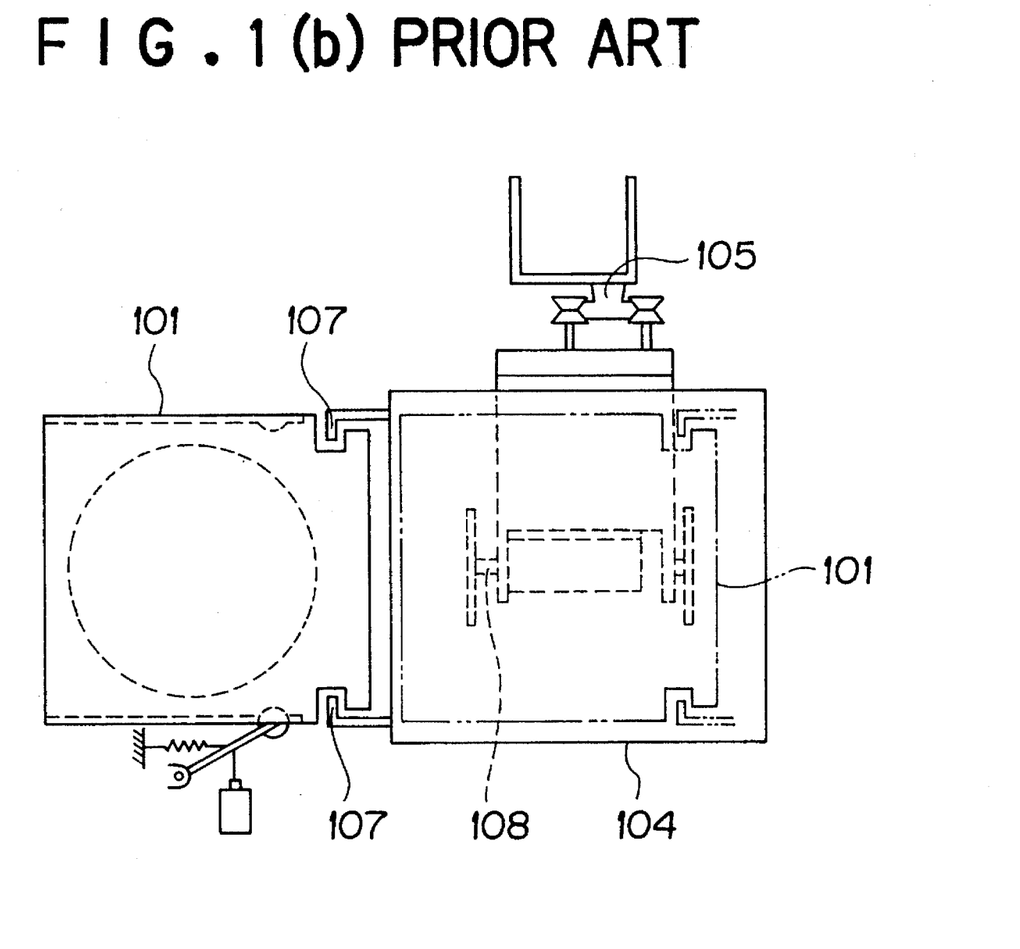
FIG. 1(b) is a plan view showing the vertical carrier incorporated in the prior art disc processing apparatus.
Figure 1C:
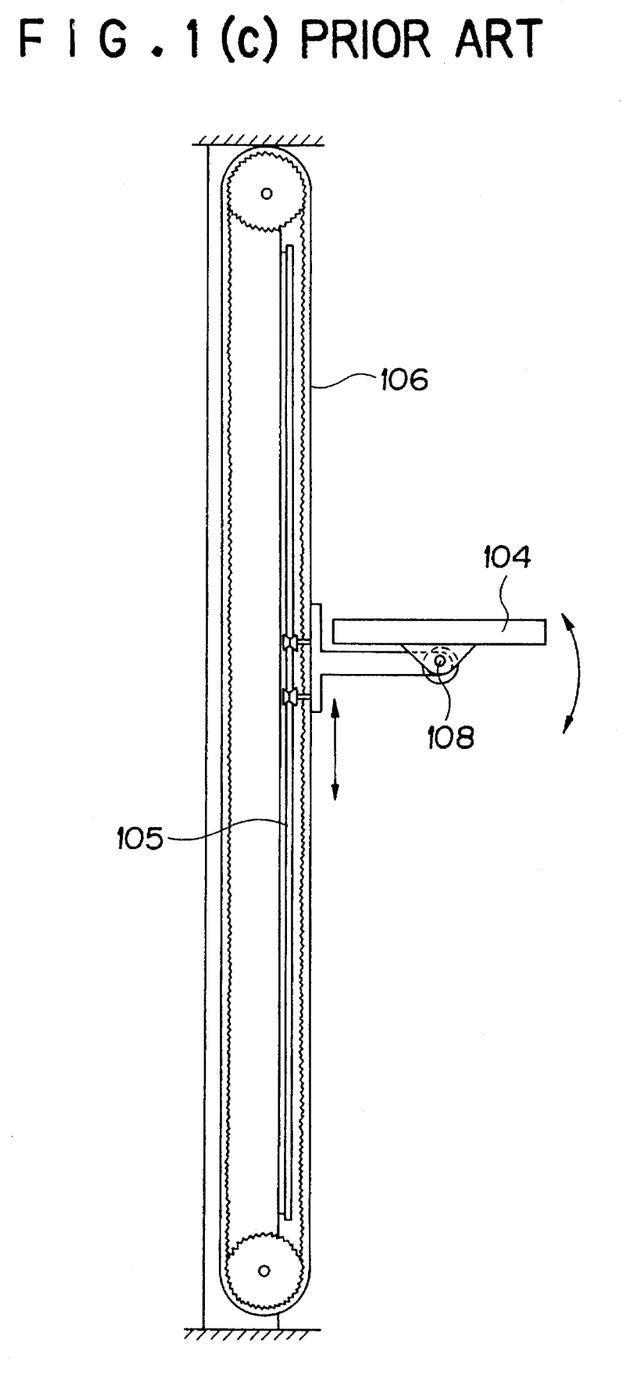
FIG. 1(c) is a side view showing the vertical carrier shown in FIG. 1(b)

An example of a prior art disc processing apparatus for automatically changing disc cartridges containing optical discs is shown in FIGS. 1(a) to (c), which has been disclosed by the same applicant and which bears Japanese Published Examined (Kokoku) Utility Model Application No. 4-22441.

With reference to the drawings, the prior art disc processing apparatus is composed roughly of a plurality of storage locations 102 arranged in parallel to each other in the vertical direction, for housing disc cartridges 101; a plurality of drive units 103 each for recording and reproducing information data to or from an optical disc housed in each disc cartridge 101; and a vertical carrier 104 disposed in front of the storage locations 102 and the drive units 103. The vertical carrier 104 is so constructed as to be movable in the vertical direction along a guide rail 105 by a driving belt 106. Further, the vertical carrier 104 is provided with a grip mechanism 107 (see FIG. 1(b)) for gripping disc cartridges 101. The vertical carrier 104 can be turned over upside down about a reversal axle 108.

In the above-mentioned prior art apparatus, the disc cartridges 101 can be carried and changed between the storage locations 102 and the drive units 103 with the use of the vertical carrier 104, there exist problems in that it takes a relatively long disc change time and further a relatively large space is inevitably required.

In more detail, the disc cartridges 101 are changed in accordance with the following steps: (1) the vertical carrier 104 is moved in the vertical direction to a designated storage location 102 on which a designated disc cartridge is laid; (2) the designated disc cartridge 101 on the designated location 102 is held by the grip mechanism 107 of the vertical carrier 104; (3) the vertical carrier 104 which holds the designated disc cartridge 101 is moved vertically to a designated drive unit 103; (4) the disc cartridge 101 is loaded onto the designated drive unit 103 with the grip mechanism 107 for writing and/or reading operations; (5) another disc cartridge 101 already used by another drive unit 103 is held by the grip mechanism 107 of the carrier 104; (6) the vertical carrier 104 is moved to a storage location 102 on which the used disc cartridge 101 has been laid; (7) the used disc cartridge 101 is returned to the home location 102 with the grip mechanism 107.

As described above, since there are a large number of steps due to the rather complicated operation, it is difficult to reduce the time required for changing the disc cartridges 101.

In addition, since there exists a large dead space between the vertical carrier 104 and the storage locations 102 or the drive unites 103, in order to carry and change the cartridges, the space factor is low and therefore there is a limit by which the total size of the disc processing apparatus has to be reduced.

SUMMARY OF THE INVENTION

With these problems in mind, therefore, it is the primary object of the present invention to provide a disc processing apparatus which can reduce the cartridge change time markedly with a simple mechanism.

To achieve this and other objects, the present invention provides a disc processing apparatus comprising:

drive means having an input/output port for loading and/or unloading the cartridge therethrough and for reading and/or writing information on the disc; a stocker arranged to be confronted with the input/output port of the drive means and having plurality of storage locations removably storing the cartridges therein, the storage locations being arranged to store the cartridges along a length thereof so that the stored cartridges are aligned substantially in parallel to each other; means for transporting the drive means in a the first direction parallel to the length of the storage locations of the stocker so that the input/output port of the drive means can be confronted with one of the plurality of storage locations of the stocker; and a carrier for transporting the cartridge in a second direction perpendicular to the first direction so as to transport the cartridge between the stocker and the drive means.

DESCRIPTION OF THE PREFERRED EMBODIMENTS

An embodiment of the disc processing apparatus according to the present invention will now be described in detail with reference to the accompanying drawings.

Figure 2:
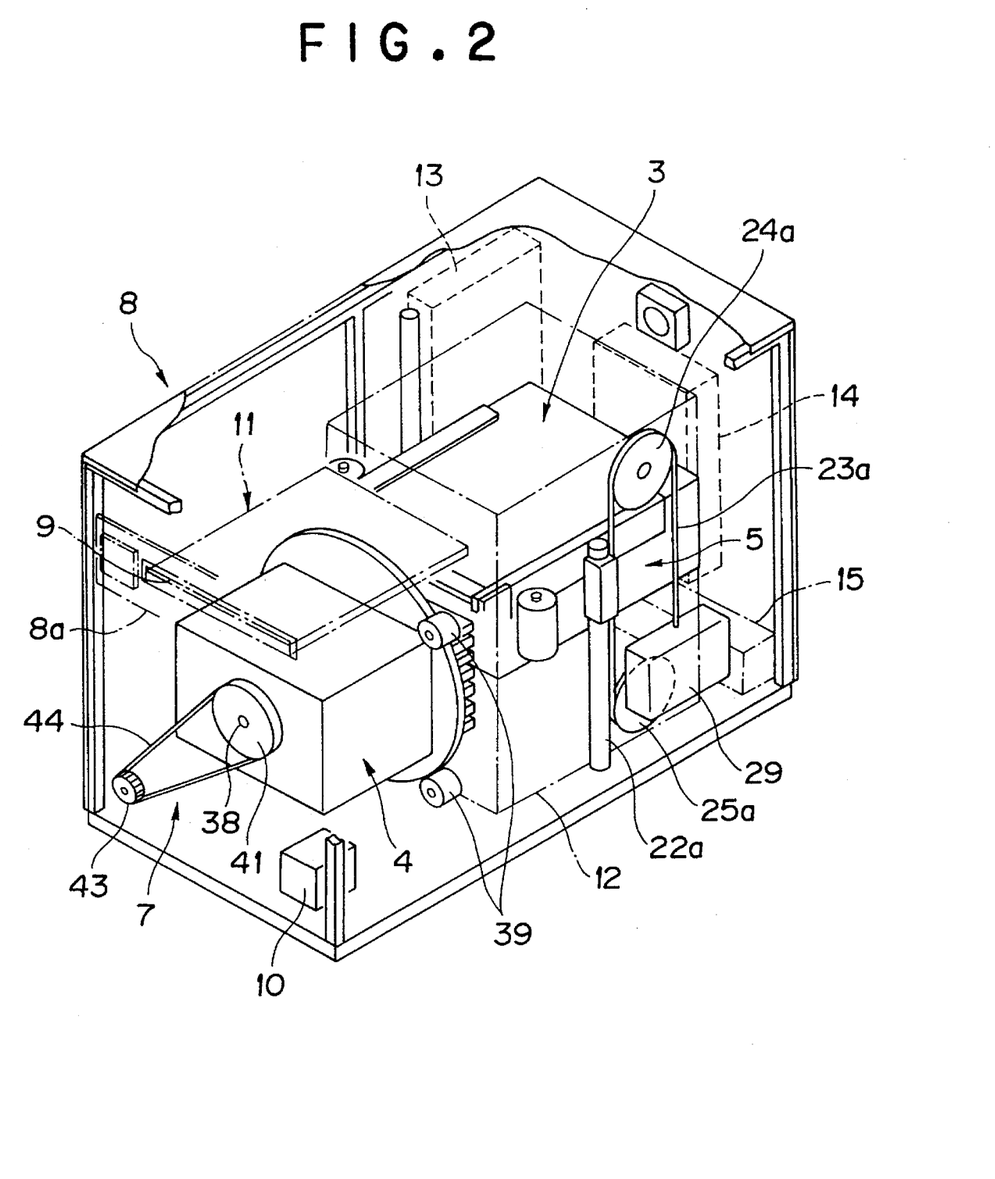
FIG. 2 is a perspective view showing an embodiment of the disc processing apparatus according to the present invention.
Figure 3A:
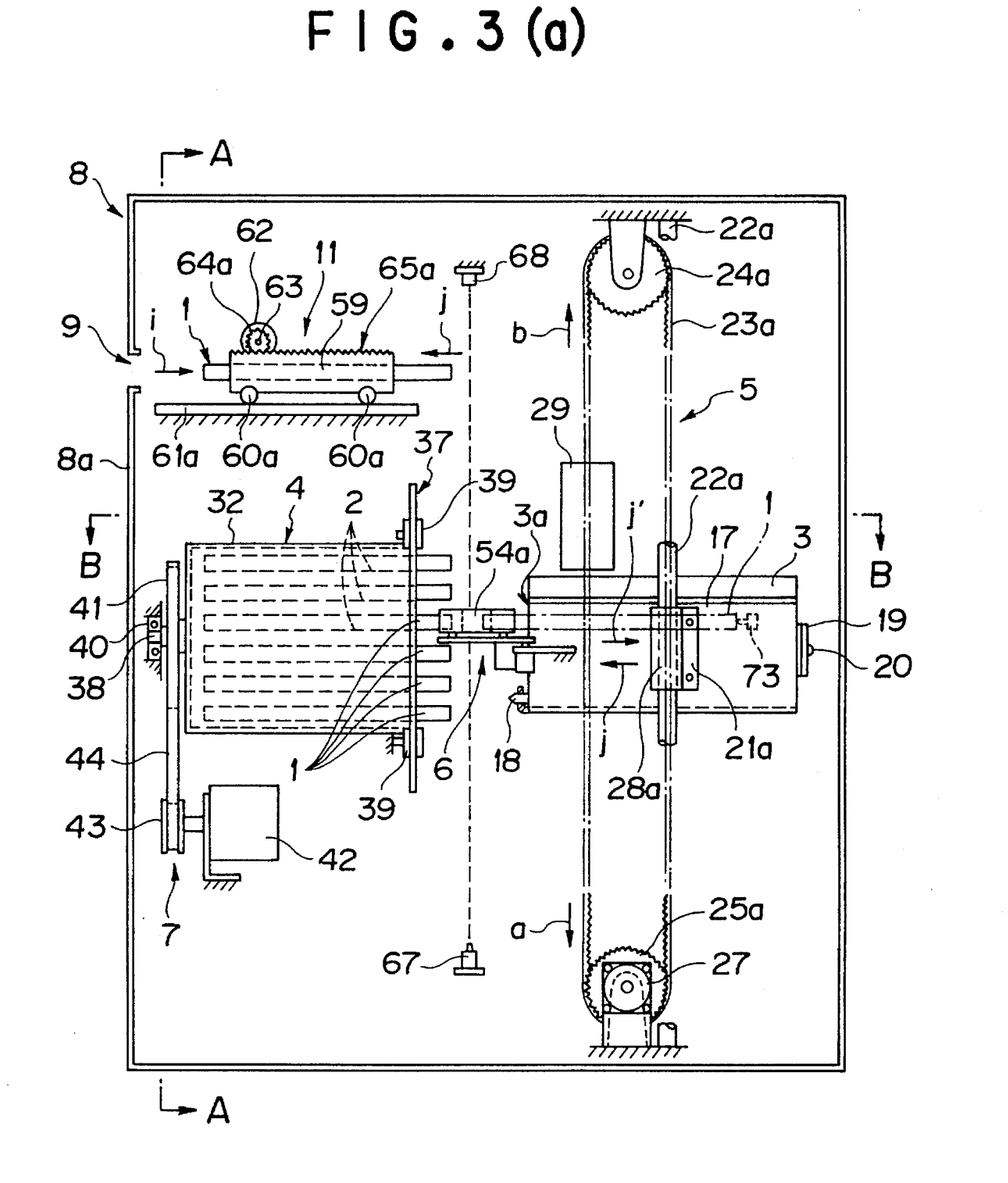
FIG. 3(a) is a cross-sectional side view showing the embodiment shown in FIG. 2.

In FIGS. 2 and 3(a) to (c), the disc processing apparatus is comprised of a single housing 8, a stocker block 4, a drive unit 3, a vertical carrier mechanism 5, a horizontal carrier mechanism 6 (see FIG. 3(a)), a stocker block reversal mechanism 7, a cartridge carriage 11, a system controller 13, etc. The housing 8 is formed with a cartridge input/output port 9 in a front panel 8a thereof. The stocker block 4 includes a plurality of horizontal storage locations 2 arranged in parallel to each other in the vertical direction, for removably housing disc cartridges 1 each including an recording medium such as an optical disc, for instance. The drive unit 3 is disposed opposite the stocker block 4. The drive unit 3 records and reproduces information data to and from the optical disc housed in the disc cartridge 1. The vertical carrier mechanism 5 moves the drive unit 3 in the vertical direction (i.e. the arrow directions a and b) along the storage locations 2 vertically arranged in parallel. The horizontal carrier mechanism 6 is attached to the drive unit 3 so as to be moved together with the unit 3 in the vertical direction (the arrow directions a and b). The horizontal carrier mechanism 6 holds and carries the disc cartridge 1 between the storage location 2 of the stocker block 4 and the drive unit 3 for changing the cartridge 1. The stocker block reversal mechanism 7 reverses the whole stocker block 4 upside down (i.e. 180 degrees) clockwise or counterclockwise (i.e. the arrow directions c and d) in FIG. 3(b). The cartridge carriage 11 is disposed horizontally behind the cartridge insertion slot 9 over the stocker block 4 and within the cabinet 8. The cartridge carriage 11 moves the disc cartridge 1 inserted horizontally through the cartridge insertion slot 9, to an inner position at which the horizontal carrier mechanism 6 can be accessed when the mechanism 6 is moved upward by the vertical carrier mechanism 5.

The system controller 13 controls the vertical carrier mechanism 5 in such a way that the drive unit 3 can be moved to any position opposite any given storage location 2 of the stocker block 4 on which any required disc cartridge 1 is put, and further the horizontal carrier mechanism 6 in such a way that the disc cartridge 1 can be loaded from the storage location 2 to the drive unit 3 and unloaded from the drive unit 3 to the home storage location 2 of the stocker block 4. In addition, the system controller 13 controls all the system operations in accordance with programs stored therein.

Further, in this apparatus as described above, since the cartridge input/output port 9 is formed in the upper portion of a front panel 8a of an apparatus cabinet 8, the disc cartridge 1 inserted through the port 9 can be directly inserted into a cartridge input/output port 3a of the drive unit 3.

A main switch 10 provided with a cover is attached to the lower portion of the front panel 8a of the housing 8. Further, a moving block 12 for moving the drive unit 3 in the vertical direction is disposed at the back of the cartridge carriage 11 and the stocker block 4. In addition, the above-mentioned system control block 13, a power supply block 14 and a connector block 15, etc. are arranged at the rear side of the housing 8, as shown in FIG. 2.

With reference to the accompanying drawings, the essential mechanisms of the disc processing apparatus will now be described in further detail.

Figure 3B:
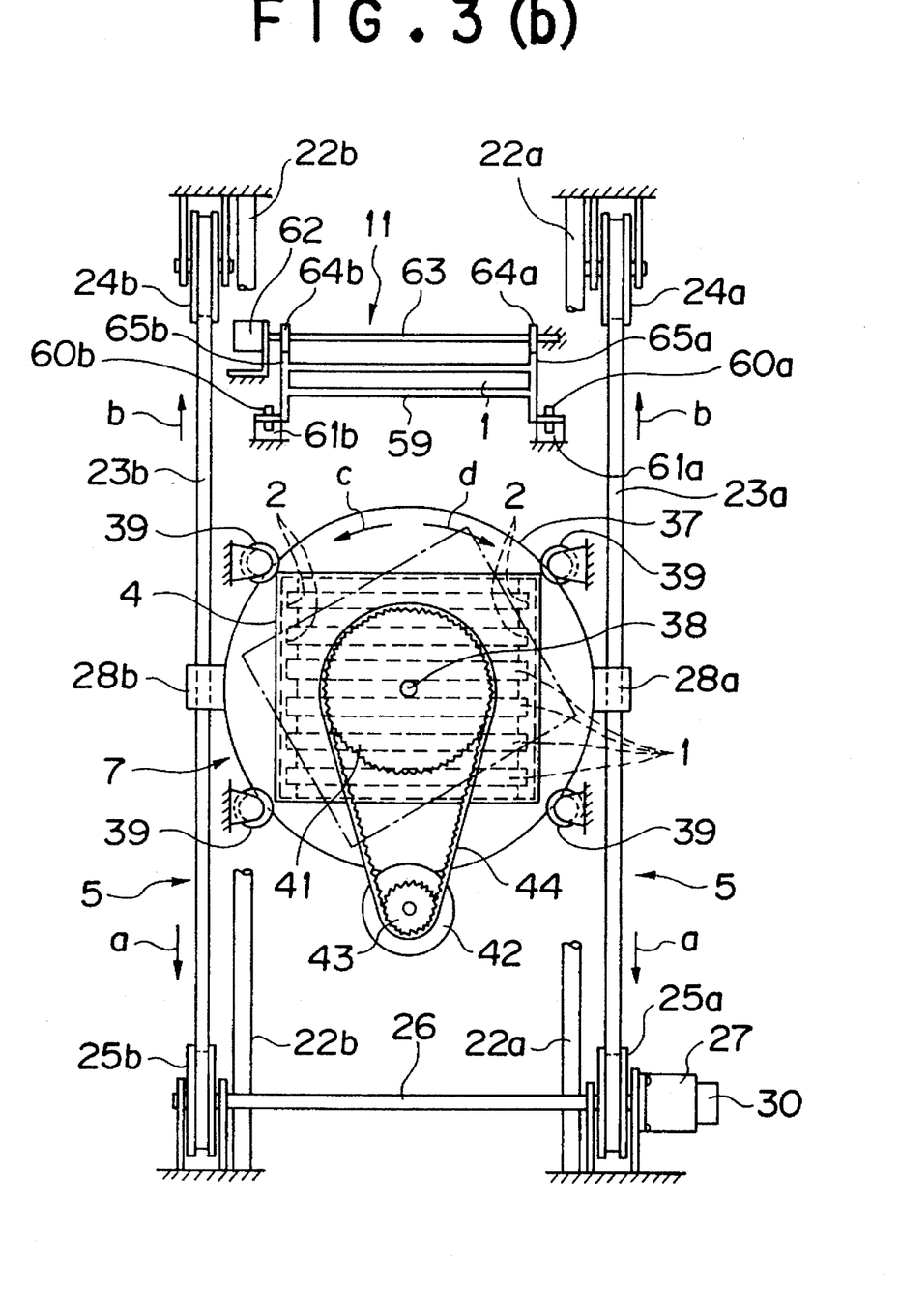
FIG. 3(b) is a side view taken along the line A—A shown in FIG. 3(a)
Figure 3C:
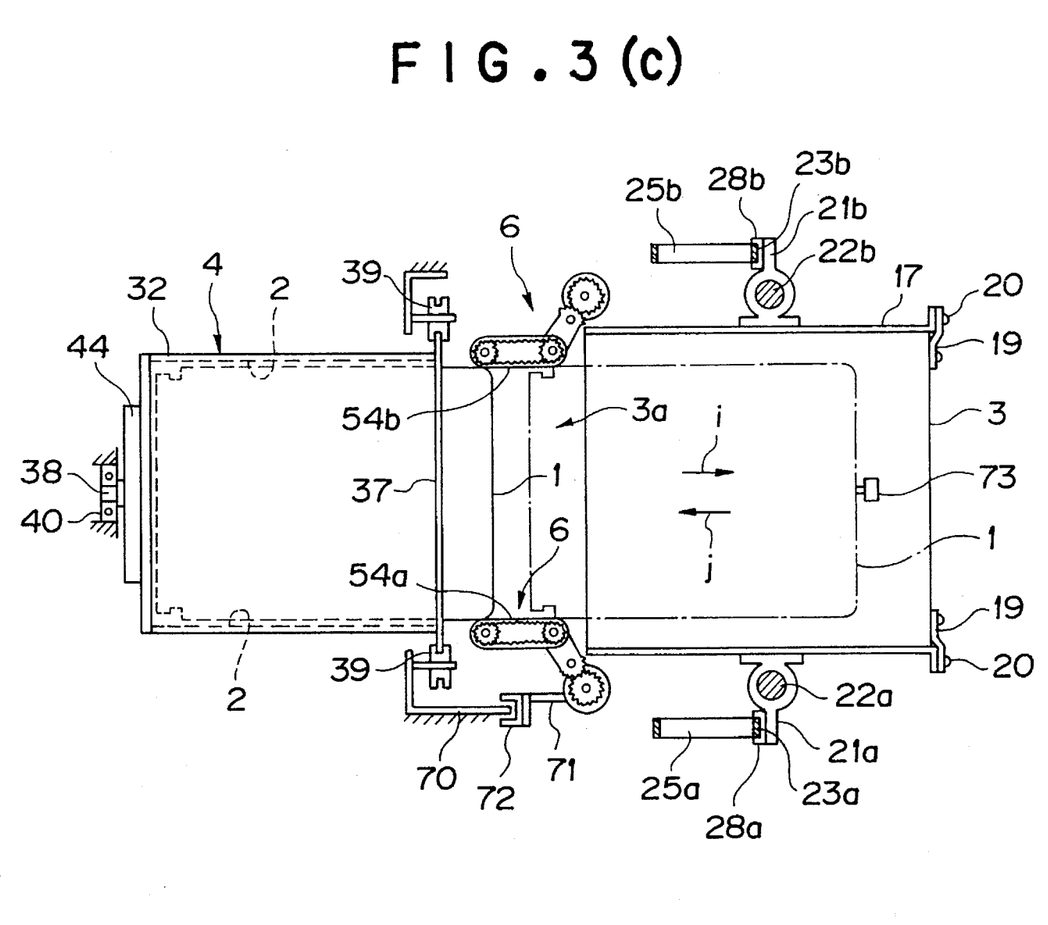
FIG. 3(c) is a plan view taken along the line B—B shown in FIG. 3(a)

With reference to FIGS. 3(a) to (c), the vertical carrier mechanism 5 will be explained. Within the moving block 12 (see FIG. 2), the drive unit 3 is housed by use of an upward extending roughly U-shaped carrier frame 17 (see FIGS. 3(a) and (c)), located in position by a plurality of locating pins 18, and further fixed by use of a plurality of fastening members 19 and mounting screws 20 (all shown in FIG. 3(a)).

The vertical carrier mechanism 5 is composed of a pair (right and left) of vertical guide shafts 22a and 22b (see FIG. 3(c)), a pair (right and left) of slidable guides 21a and 21b (see FIG. 3(c)), a pair (right and left) of timing belts 23a and 23b, two pairs (upper and lower) of timing pulleys 24a, 24b and 25a, 25b, a motor 27, etc., as shown in FIG. 3(b). As shown in FIG. 3(c), the vertical guide shafts 22a and 22b are disposed vertically on the right and left sides of the carrier frame 17. The slidable guides 21a and 21b are fixed to both the sides of the carrier frame 17 and moved vertically along the guide shafts 22a and 22b in the arrow directions a and b, respectively in FIG. 3(b). The timing belts 23a and 23b are wound around the upper and lower timing pulleys 24a, 24b and 25a, 25b, respectively. The motor 27 is connected to a drive shaft 26 linking the two lower right and left pulleys 25a and 25b, as depicted in FIG. 3(b). Further, parts of both the timing belts 23a and 23b are fixed to both the slidable guides 21a and 21b with two fastening members 28a and 28b, respectively, as shown in FIG. 3(c). In addition, a pair of (right and left) counterweights 29 (see FIG. 3(a)) are fixed to both timing belts 23a and 23b for balancing the weight of the drive unit 3.

Therefore, when the motor 27 is rotated in the clockwise or counterclockwise direction to drive the timing pulleys 25a and 25b via the drive shaft 26 in the forward or reverse direction, both the timing belts 23a and 23b are driven up and down in the arrow directions a and b, so that the carrier frame 17 is moved up and down along both guide shafts 22a and 22b to move the drive unit 3 in the vertical direction. In this vertical movement, since the weight of both the counter weights 29 are balanced with that of the drive unit 3, it is possible to smoothly move the drive unit 3 up and down and to stop the drive unit 3 securely and safely. Further, the vertical stroke of the drive unit 3 is determined by counting the movement pitches with the use of an encoder 30 (to be described later with reference to FIG. 7) mounted on the motor 27.

Figure 4A:
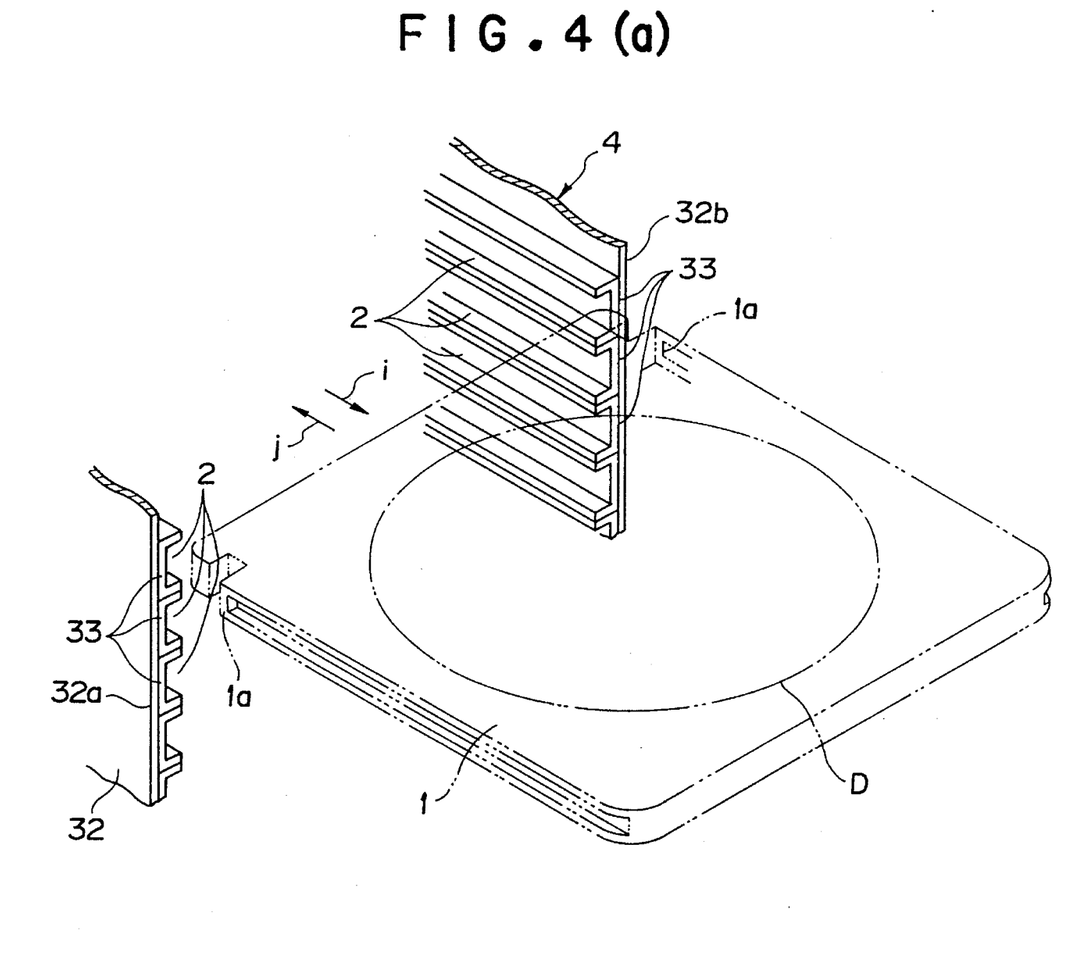
FIG. 4(a) is a partial perspective view showing the stocker block of the disc processing apparatus according to the invention.
Figure 4B:
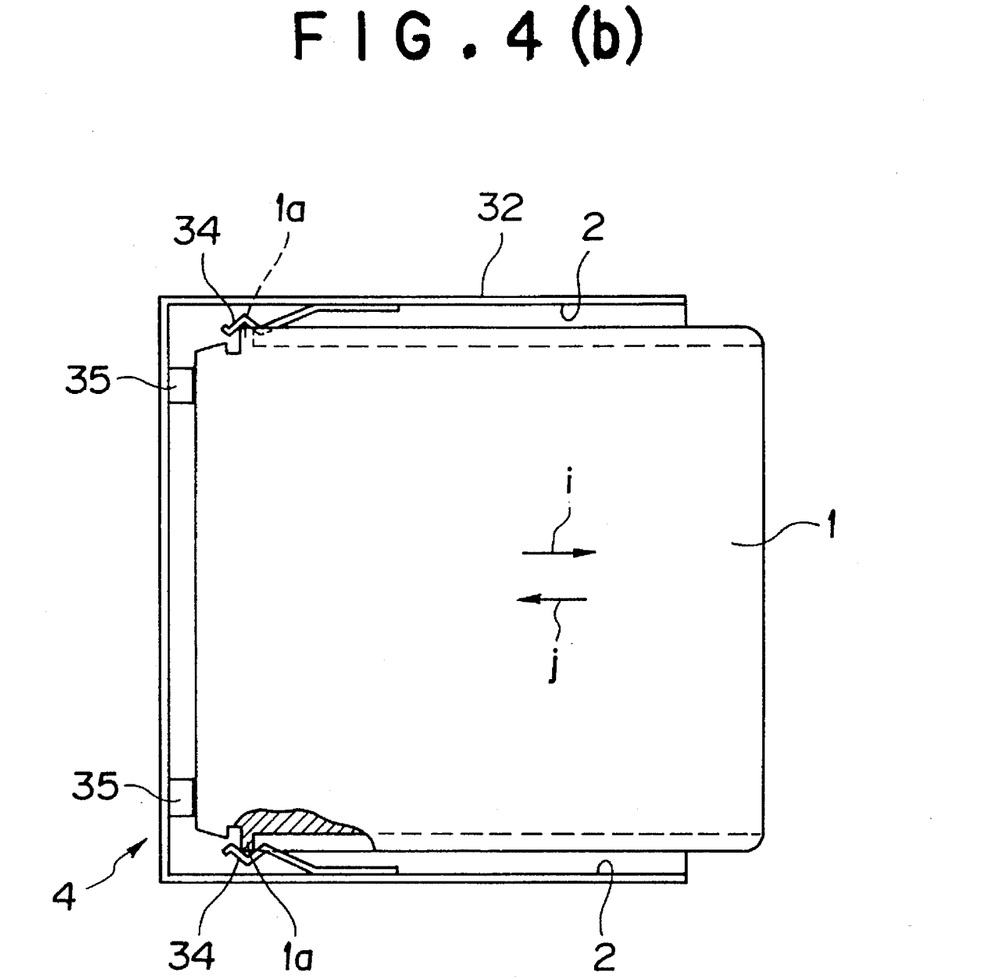
FIG. 4(b) is a plane view showing the same stocker block.

With reference to FIGS. 4(a) and (b), the stocker block 4 is composed of a plurality of vertically arranged storage locations 2. These locations 2 are formed by fixing plural pairs of two opposing U-shaped rails 33 to the inner surfaces of the right and left side plates 32a of a stocker 32 so as to be arranged in parallel to each other in the vertical direction. Further, the respective locations 2 are each provided with a pair (right and left) of lock springs 34 and a pair of stopper members 35 at the innermost portion of the storage locations. The respective lock springs 34 are engaged with a pair (right and left) of engagement projections 1a formed on the right and left side surfaces of the disc cartridge 1, as best shown in FIG. 4(b).

Figure 5:
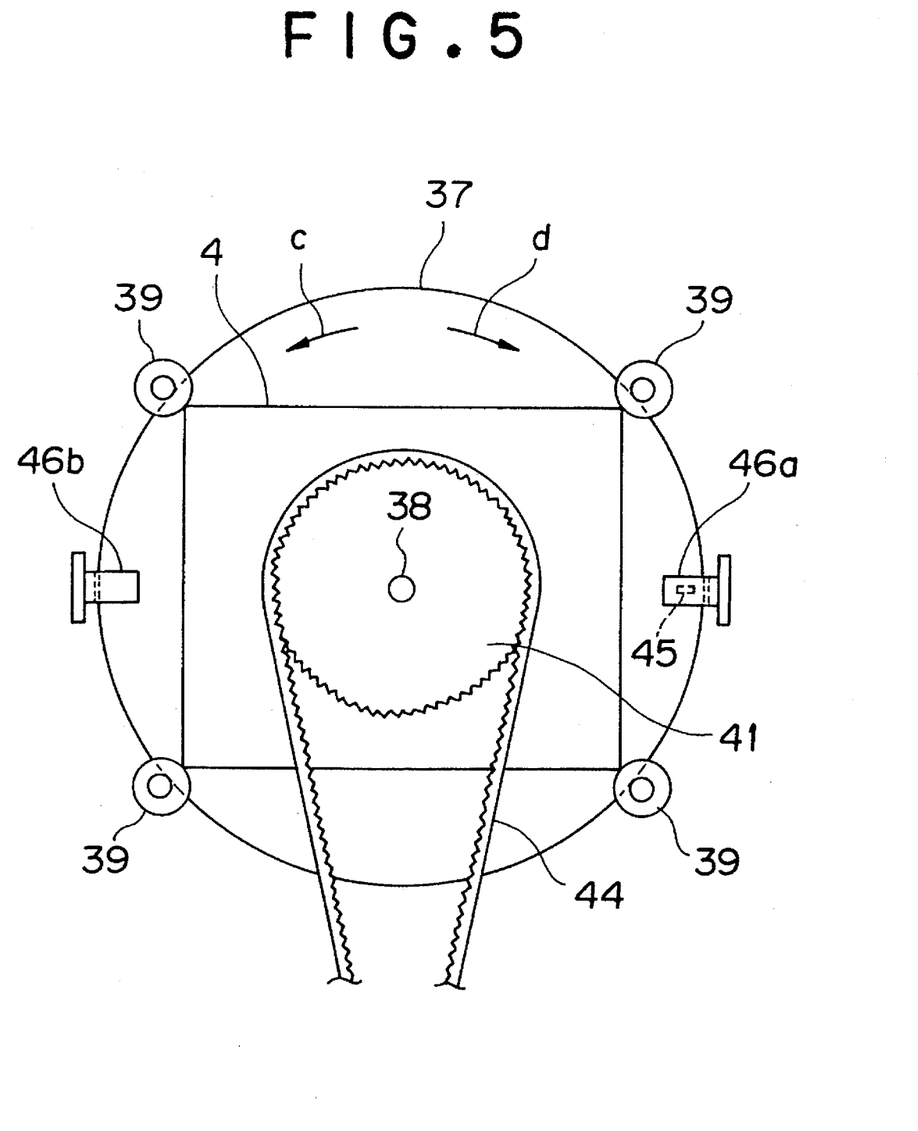
FIG. 5 is a partial side view showing the reversal mechanism including a pair of optical sensors of the disc processing apparatus according to the invention.

With reference to FIGS. 3(a), 3(b) and 5, the stocker block reversal mechanism 7 is composed of a circular support plate 37, a pivotal axle 38, a plurality of rollers 39, two timing pulleys 41 and 43, a timing belt 44, a motor 42, etc. The circular support plate 37 is disposed at the center of the stocker block 4 so as to extend radially outwardly from the stocker block 4. The pivotal axle 38 is fixed to the front end surface of the stocker 32. The rollers 39 support the outer circumference of the circular support plate 37 so that the support plate 37 can be rotated freely. The pivotal axle 38 is rotatably supported by a bearing 40 (see FIG. 3(a)). The timing pulley 41 is fixed to the stocker 32 concentrically with the pivotal axle 38. The timing pulley 43 is driven by the motor 42. The timing belts 44 are wound around the two pulleys 41 and 43, respectively.

Therefore, when the motor 42 is driven clockwise or counterclockwise, the timing belt 38 is moved in the forward and reverse directions c and d (in FIG. 3(b)) via the timing pulleys 41 and 43, so that the stocker block 4 is pivoted 180 degrees upside down about the pivotal axle 38 together with the circular support plate 37 as shown in FIG. 5. Further, as shown in FIG. 5, a pair of optical sensor devices 46a and 46b are disposed so as to detect light passing through a slit 45 formed near the outer circumference of the circular support plate 7. For instance, when the optical sensor device 46a detects light passing through the slit 45, the stocker block is detected that the right side is located upward; and when the associated optical sensor device 46b detects light passing through the slit 45, the stocker block is detected that the reverse side is located upward. That is, the motor 42 is stopped at an appropriate position when the paired optical sensor detect devices 46a and 46b detect the respective 180 degree reversal positions.

Figure 6:
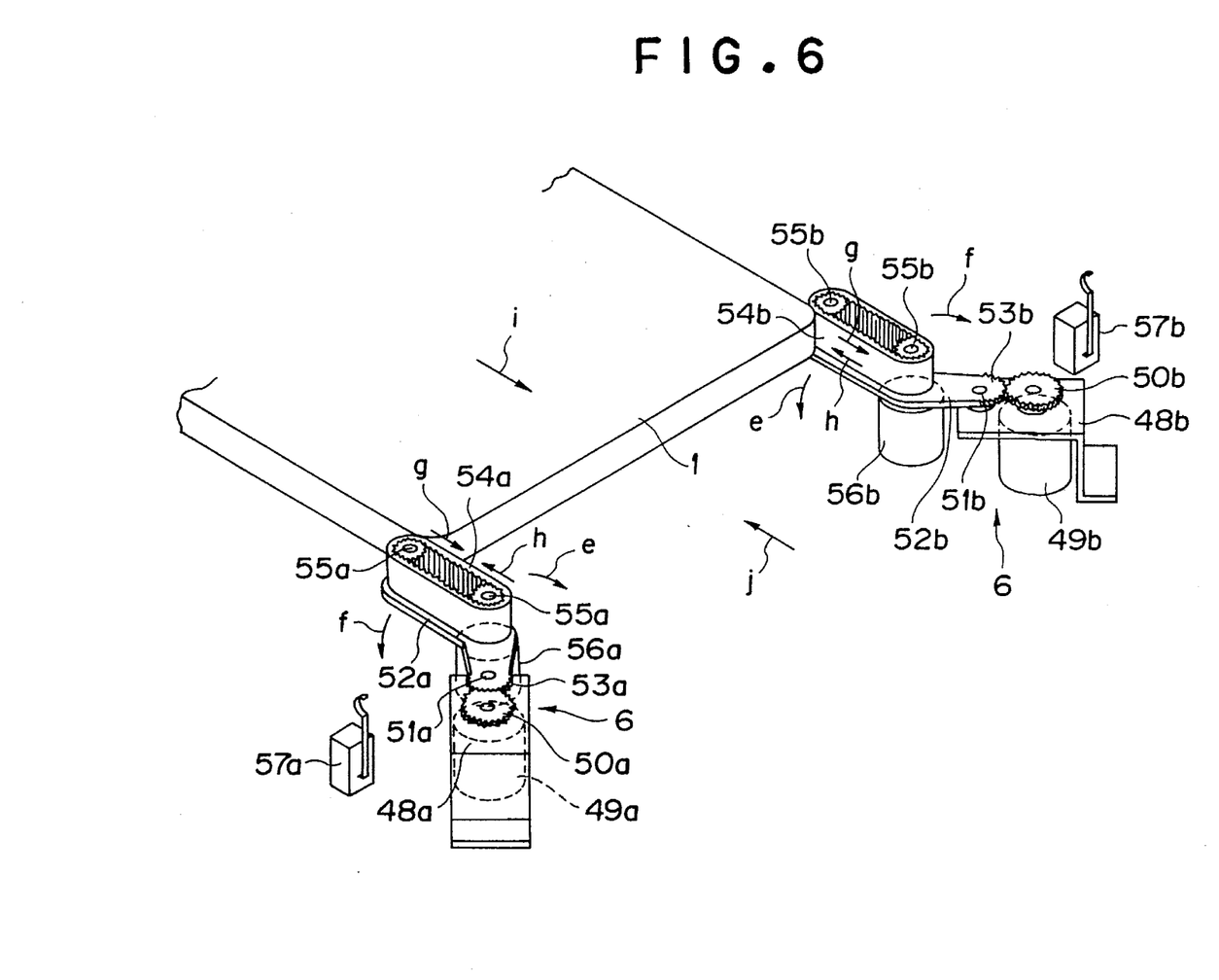
FIG. 6 is a perspective view showing the horizontal carrier mechanism of the apparatus according to the invention.

With reference to FIGS. 3(a), 3(c) and 6, each horizontal carrier mechanism 6 is mounted on both right and left sides of the carrier frame 17 and on the side of the stocker block 4 in symmetrical positional relationship with respect to each other. Each horizontal carrier mechanism 6 is composed of a motor 49a or 49b, a drive gear 50a or 50b, a horizontal open- close lever 52a or 52b, a timing belt 54a or 54b, a pair of timing pulleys 55a or 55b, a motor 56a or 56b, etc. The motor 49a or 49b is mounted on a bracket 48a or 48b. The drive gear 50a or 50b is rotated clockwise or counterclockwise by the motor. The horizontal open-close lever 52a or 52b formed with a driven gear 53a or 53b is mounted on the bracket 48a or 48b so as to be pivoted about a fulcrum axle 51a or 51b in the direction e or f in FIG. 6. The timing belt 54a or 54b is wound around the two timing pulleys 55a or 55b. The motor 56a or 56b is mounted on the open-close lever 52a or 52b to drive the timing belt 54a or 54b in the directions g and h in FIG. 6, respectively. Further, both the timing belts 54a and 54b are arranged at a height flush with the cartridge input/output port 3a of the drive unit 3.

Therefore, when the motors 49a and 49b are driven clockwise or counterclockwise, the open-close levers 52a and 52b are pivoted via the drive gears 50a and 50b and the driven gears 53a and 53b in the close or open direction e or f. Further, when the motor 56a and 56b are driven clockwise or counterclockwise, the timing belts 54a and 54b are shifted in the directions g and h. In addition, a pair of limit switches 57a and 57b are mounted on both right and left sides of the carrier frame 17, to detect the open angles of the open-close levers 52a and 52b in the f direction and to thereby stop the motors 56a and 56b, respectively.

With reference to FIGS. 3(a) and 3(b), the cartridge carriage 11 is composed of a cartridge tray 59 formed with a pair of racks 65a and 65b, a plurality of rollers 60a and 60b, a pair of guide rails 61a and 61b, a motor 62 fixed to a drive axle 63 having a pair of pinions 64a and 64b, etc. The cartridge tray 59 is flush with the cartridge input/output port 9 and moved in the arrow directions i and j by the rollers 60a and 60b along the guide rails 61a and 61b. Accordingly, when the motor 62 is rotated clockwise or counterclockwise, since the right and left pinions 64a and 64b fixed to the drive axle 63 of the motor 62 are rotated, the cartridge tray 59 is driven in the horizontal direction via the racks 65a and 65b.

Further, as shown in FIG. 3(a), an optical sensor for locating the disc cartridge 1 at an appropriate horizontal position within the housing 8 is arranged in the vertical direction between the stocker block 4 and the drive unit 3. The optical sensor is composed of a light emitting element 67 and a light receiving element 68.

Figure 7:
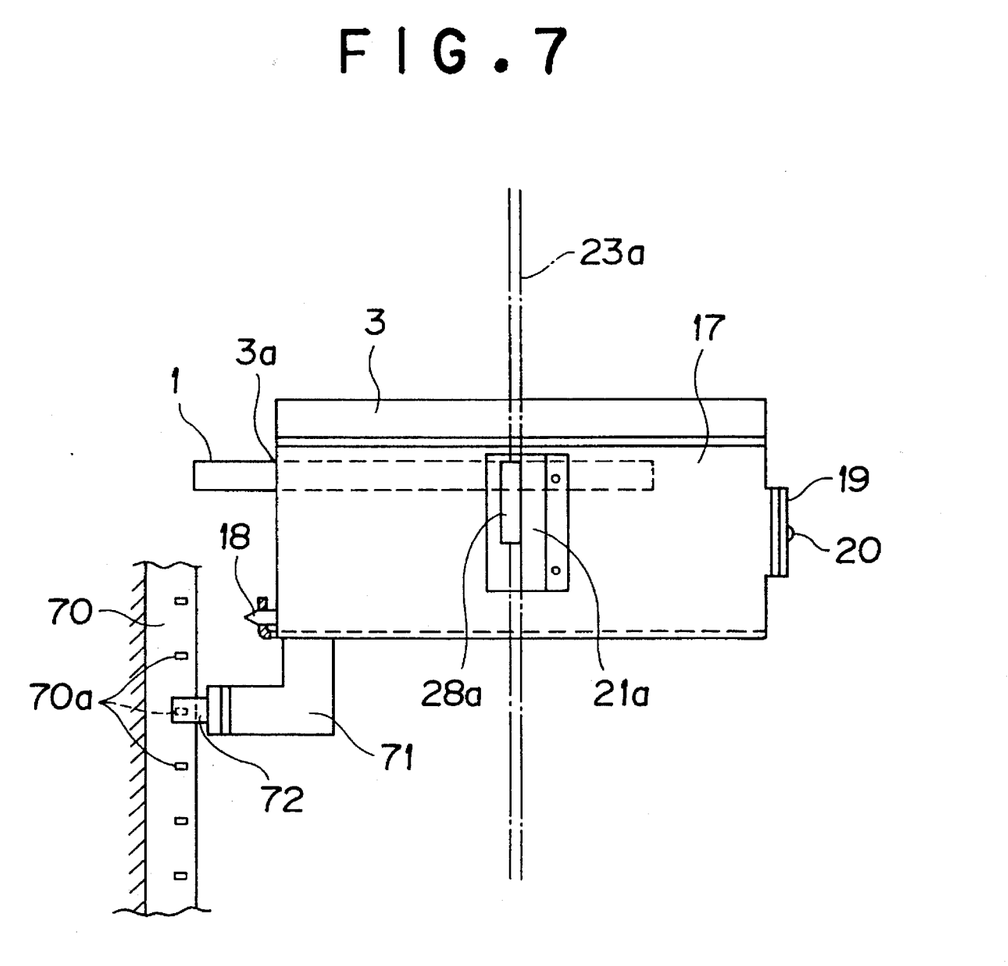
FIG. 7 is a side view showing a locating encoder of the drive unit of the apparatus according to the invention.

With reference to FIG. 7, an encoder for locating the vertical position (the arrow directions a and b) of the drive unit 3 is provided. The encoder is composed of an optical sensor 72 attached to the carrier frame 17 via a bracket 71, and a vertical slit plate 70 formed with a plurality of vertically arranged slits 70a.

The operation of the disc processing apparatus constructed as described above will be described under classifications as follows:

[Operation of housing a disc cartridge by the operator]

With reference to FIG. 3(a), when the operator inserts a disc cartridge 1, through the cartridge input/output port 9 formed in the front panel 8a of the housing 8, in the horizontal direction (the arrow direction i), the inserted disc cartridge 1 is placed horizontally in the tray 59 of the carriage 11. When a sensor (not shown) detects the presence of the disc cartridge 1 in the tray 59, the motor 62 is driven in the forward direction to rotate the pinions 63a and 64b, so that the tray 59 is moved deeply into the housing 8 in the horizontal direction (the arrow direction i) along the guide rails 61a and 61b via the racks 65a and 65b formed in the tray 59. When the inner end of the inserted disc cartridge 1 reaches the horizontal position at which the cartridge 1 can be inserted into the storage locations 2 or the horizontal carrier mechanism 6 can hold the inserted disc cartridge 1, the optical sensor composed of the light emitting and receiving elements 67 and 68 detects this position to stop the motor 62.

At this time, the drive unit 3 provided with the horizontal carrier (right and left) mechanism 6 has been already moved in the vertical direction to the height flush with the carriage 11. Therefore, immediately after the motor 62 of the carriage 11 has been stopped, the horizontal carrier mechanism 6 starts to operate.

In more detail, with reference to FIG. 6, the motors 49a and 49b are driven in the forward direction, so that the open-close levers 52a and 52b are pivoted closed horizontally in the arrow direction e via the drive gears 50a and 50b and the driven gears 53a and 53b, in order to allow the timing belts 54a and 54b to hold both the side surfaces of the inserted disc cartridge 1 from both sides. When the cartridge 1 is held securely, the motors 49a and 49b are both stopped. At the same time, the motors 56a and 56b are driven in the forward direction to move the timing belts 54a and 54b in the arrow direction g (the same as the direction i), so that the cartridge 1 is removed from the tray 59 of the carriage 11 horizontally in the arrow direction i and further inserted into the input/output port 3a of the drive unit 3 at the same level. When a detection switch 73 (shown in FIGS. 3(a) and (c)) attached to the carrier frame 17 detects the presence of the inserted disc cartridge 1, both the motors 56a and 56b are stopped.

Thereafter, the vertical carrier mechanism 5 is actuated to move down the drive unit 3 having the inserted disc cartridge 1 in the arrow direction a to the position of the designated empty storage location.

In more detail, as shown in FIGS. 3(a) and (b), the motor 27 is driven in the forward direction to move the timing belts 23a and 23b via the drive shaft 26 and the timing pulleys 25a and 25b. Since the drive unit 3 is moved downward being guided along the guide shafts 22a and 22b (shown in FIG. 3(c)), the disc cartridge 1 can be moved down to the designated empty storage location 2 by the drive unit 3. In the downward movement, the stroke of the drive unit 3 is measured by the encoder 30 composed of the optical sensor 72 and the vertical slit plate 70 formed with the slits 70a as shown in FIG. 7. When the drive unit 3 is moved downward by the vertical carrier mechanism 5 in position, the motor 27 is stopped.

Thereafter, as shown in FIG. 6 again, the horizontal carrier (right and left) mechanism 6 is actuated again. That is, the motors 56a and 56b are driven in the reverse direction to move the timing belts 54a and 54b in the arrow direction h (the same direction as j), so that the disc cartridge 1 is removed from the drive unit 3 into the designated empty storage location 2 horizontally. The inserted disc cartridge 1 is stopped by the stoppers 35, and further the projections 1a of the disc cartridge 1 are engaged with the lock springs 34 of the storage location 2 (see FIG. 4(b)), with the result that the disc cartridge 1 can be located correctly within the storage location 2. Under these conditions, when the optical sensor composed of the light emitting and receiving elements 67 and 68 (see FIG. 3(a)) detects the end of the disc cartridge 1, the motors 56a and 56b are both stopped and further the motors 49a and 49b are driven in the reverse direction to pivot open the open-close levers 52a and 52b in the arrow direction f in FIG. 6, so that the timing belts 54a and 54b are both released from both the side surfaces of the disc cartridge 1 in the arrow direction f. When the pivotal open angles of the open-close levers 52 and 52b are detected by the limit switches 57a and 57b, both the motors 49a and 49b are stopped.

Further, after that, the motor 27 of the vertical carrier mechanism 5 is driven in the reverse direction to move the timing belts 23a and 23b via the drive shaft 26 and the timing pulleys 25a and 25b also in the reverse direction, so that the drive unit 3 is moved upward in the arrow direction b to the position of the carriage 11. In the upward movement, the stroke of the drive unit 3 is measured by the encoder 30 composed of the optical sensor 72 and the vertical slit plate 70 formed with the slits 70a as shown in FIG. 7. When the horizontal carrier mechanism 6 is moved up in position, the motor 27 is stopped. Under these conditions, the horizontal carrier mechanism 6 is located at a height flush with the cartridge carrier 11.

As described above, a single disc cartridge 1 has been housed in the storage location 2. By repeating the above-mentioned operation, a plurality of disc cartridges can be housed in the stocker block 4. After all the storage locations 2 are filled with the disc cartridge 1 inserted through the cartridge input/output port 9, the drive unit 3 is moved downward to the lowermost home position for standing by the succeeding operation. Further, it is possible to remove the disc cartridge 1 from the respective storage locations 2 of the stocker block 4 through the cartridge input/output port 9, by executing the above-mentioned operation in the reverse sequence.

[Operation of processing a disc]

When a disc cartridge 1 is designated for recording or reproduction, the vertical carrier mechanism 5 as shown in FIGS. 3(a) to (c) is actuated to move the drive unit 3 from the lowermost home position to the position of an designated storage location 2. After that, the designated cartridge 1 housed in the storage location 2 is removed from the storage location 2 by the horizontal carrier mechanism 6 in the horizontal direction (the arrow direction i), and further inserted into the cartridge input/output port 3a of the drive unit 3 horizontally. When the detection switch 73 of the carrier frame 17 detects the presence of the disc cartridge 1, the vertical carrier mechanisms 6a are stopped. Simultaneously, the disc cartridge 1 is further moved to the loading position within the drive unit 3, at which the information data can be recorded or reproduced to or from the optical disc D within the disc cartridge 1.

After the recording and reproducing operation to and form the optical disc D, the disc cartridge 1 is removed from the drive unit 3 and further inserted into the designated home storage location 2 in the arrow direction j, by executing the above-mentioned operation in reverse sequence.

[Operation of reversing the storage locations]

The optical disc D housed in the disc cartridge 1 is of a double sided recording type. Therefore, in order to record and reproduce information data to or from the optical disc D, it is necessary to turn over the cartridge 1 through 180 degrees upside down, before being inserted into the drive unit 3.

Therefore, when a disc reversal command is outputted from the system control block 13, the motor 42 of the stocker block reversal mechanism 7 is driven in the forward and reverse directions alternately whenever the reversal command is outputted. In more detail, with reference to FIGS. 3(a) and (b) and FIG. 5, the timing belt 44 is driven in the arrow direction c or d via the timing pulley 43, so that the entire stocker block 4 is reversed by 180 degrees together with the circular support plate 37 with the pivotal axle 38 at its center. The reversal operation is detected alternately by the optical sensors 46a and 46b in cooperation with the slit 45 formed in the circular support plate 37, to stop the motor 42. Further, in the reversal operation, since the stocker block 4 is pivoted under the condition that the support plate 37 is supported by the rollers 39, it is possible to smoothly reverse all the disc cartridges 1 housed on the storage locations 2 of the stocker block 4, simultaneously and quickly by 180 degrees.

[Operation of recording and reproduction of a directly inserted cartridge]

As already described, when the disc cartridge 1 is inserted onto the cartridge carriage 11 through the cartridge input/output port 9, since the inserted disc cartridge 1 can be taken up by the horizontal carrier mechanism 6 and further shifted into the drive unit 3 in the arrow direction i, it is possible to directly load the disc cartridge 1 into the unit 3 for recording or reproduction operation of the optical disc D.

The present invention has been described on the basis of one embodiment. However, various modifications can be made without departing the technical concept of the present invention as follows:

Without being limited to only the disc cartridge housing optical discs, the disc processing apparatus of the present invention can be applied to the apparatuses for changing various types of cartridges which house various recording media.

The disc processing apparatus of the present invention has the following effects:

Since the drive unit itself is moved in the vertical direction along the vertically arranged storage locations, without the use of any vertical carrier as shown in FIG. 1(a) and further the disc cartridge is directly moved horizontally between the storage locations and the drive unit, it is possible to markedly reduce the time required to change the disc cartridges.

Since no vertical carrier as shown in FIG. 1(a) is required, it is possible to simplify the structure of the entire apparatus and also reduce the cost thereof.

Since no vertical carrier as shown in FIG. 1(a) is required and further the storage locations and the drive unit are arranged facing and near to each other, it is possible to reduce the size and space of the changing apparatus.

Since the cartridge input/output port formed in the front panel is arranged opposite to the cartridge input/output port of the drive unit and further the disc cartridge inserted through the port formed in the front panel is moved downward to the storage locations together with drive unit, it is possible to eliminate the mechanism for moving the disc cartridge inserted through the cartridge input/output port formed in the front panel to the storage locations, so that the structure can be simplified and thereby the size can be reduced.

Since the disc cartridge inserted through the port formed in the front panel can be directly inserted into the drive unit at the same horizontal level, it is possible to immediately record or reproduce data or signals to or from the medium housed in the cartridge.

Since the drive unit can be moved up and down along the storage locations and further the stocker block including plural stockers can be reversed by the stocker block reversal mechanism where necessary, it is possible to simplify the structure of the reversal mechanism of the stocker block and further to reverse the stocker block within a small space.

What is claimed is:

1. A disc processing apparatus for processing discs enclosed in respective cartridges and each having top and bottom playing surfaces, comprising:

a stocker having means defining a plurality of storage locations for removably storing respective cartridges therein in a predetermined order, said storage locations being arranged one after the other in a sequence direction with cartridges stored at said locations being aligned substantially in parallel to each other;

means mounting said stocker for movement only in rotation about a fixed axis which extends perpendicular to said sequence direction and is substantially centered in said sequence direction in respect to said plurality of storage locations;

means for rotating said stocker by 180 degrees about said fixed axis between a first position and a second position in which said order in which the cartridges are stored and said top and bottom playing surfaces of the disc in each cartridge are reversed;

drive means having an input/output port for loading and/or unloading a cartridge therethrough in directions parallel to said fixed axis, and means for reading and/or writing information on one of said surfaces of the respective disc of a cartridge loaded in said drive means;

means for rectilinearly transporting said drive means only in a first direction parallel to said sequence direction of the storage locations with said stocker in either said first position or said second position of the stocker so that the input/output port of said drive means can be confronted with a selected one of the plurality of storage locations of said stocker; and carrier means mounted at said drive means and movable therewith for transporting a selected cartridge in a second direction which is parallel to said fixed axis and perpendicular to said first direction so as to transport said selected cartridge between said stocker and said input/output port of the drive means.

2. A disc processing apparatus according to claim 1, further comprising a single housing for substantially covering said drive means, said stocker, said means for transporting said drive means in the first direction and said carrier means.

3. A disc processing apparatus according to claim 2, in which said housing has an input/output port in a front side thereof for the insertion and withdrawal of a cartridge therethrough, and in which said means for rectilinearly transporting said drive means is selectively operative to dispose said drive means with said input/output port of the drive means in alignment with said input/output port of the housing; and further comprising a carriage for holding a cartridge and being movable within said housing in said second direction between a first position in which one end of said cartridge held by the carriage extends outside the housing through said input/output port of the housing and a second position of the carriage in which the other end of said cartridge held by the carriage is disposed to be caught by said carrier means for transport by the latter into said drive means through said input/output port of the drive means aligned with said input/output port of the housing.

4. A disc processing apparatus according to claim 1, in which said carrier means has a pair of rollers operative to move relative to each other between an engaged position where said pair of rollers hold side edges of a cartridge therebetween and a released position where said pair of rollers are away from the side edges of the cartridge.

5. A disc processing apparatus according to claim 1, further comprising a support plate extending outwardly from an outer surface of said stocker and having an outer edge in the form of a circumference of a circle, and a plurality of rollers rotatably supporting said outer edge of the support plate of said stocker, said fixed axis of rotation of said stocker being arranged to be coincident with the center of said support plate.

6. A disc processing apparatus according to claim 5, in which said support plate has a perforation; and further comprising a pair of light detectors each having a light emitting element and a light receiving element, respectively, the light receiving element of one of said light detectors detecting the incidental light from the respective light emitting element when said stocker is at said first position and the light receiving element of the other of said light detectors detecting the incidental light from the respective light emitting element when said stocker is at said second position thereof so that the position of said stocker is thereby detected.

7. A disc processing apparatus according to claim 1, in which each of said cartridges stored at said locations in said stocker is arranged generally horizontally in either of said first and second positions of said stocker.

8. An apparatus for processing discs enclosed in respective cartridges and which each have top and bottom playing surfaces, comprising:

a housing having an access opening for receiving and discharging said cartridges one at a time therethrough;

a stocker having means defining a plurality of storage locations for removably storing respective cartridges therein in a predetermined order, said storage locations being arranged one after the other in a row with cartridges stored at said locations being aligned substantially in parallel to each other;

means mounting said stocker within said housing for movement only in rotation about a fixed axis which extends perpendicular to said row and is substantially centered along said row in respect to said plurality of storage locations;

means for rotating said stocker by 180 degrees about said fixed axis between a first position and a second position in which said order in which the cartridges are stored and said top and bottom playing surfaces of the disc in each cartridge are reversed, with said row of storage locations in each of said first and second positions of said stocker being in alignment with said access opening;

drive means having an input/output port for loading and/or unloading a cartridge therethrough in directions parallel to said axis, and means for reading and/or writing information on one of said surfaces of a disc in a cartridge loaded in said drive means;

means for rectilinearly transporting said drive means only in a first direction parallel to said row of storage locations with said stocker in either said first position or said second position thereof so that said input/output port of said drive means can be confronted with a selected one of said plurality of storage locations of the stocker or with said access opening of the housing; and carrier means mounted on said drive means and movable therewith for transporting a cartridge in a second direction which is parallel to said fixed axis and perpendicular to said first direction so as to transport a cartridge between said access opening and said input/output port of the drive means or between a selected storage location of the stocker and said input/output port.

* * * * *